Sept. 29, 1942.   B. J. ZIEGLER   2,297,122
PROCESS OF MAKING MULTIFOCAL LENSES
Filed Sept. 13, 1940   2 Sheets-Sheet 1
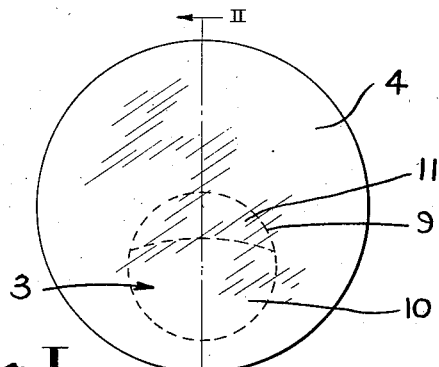
Fig. I
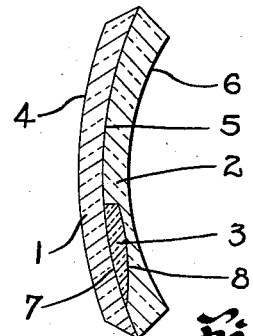
Fig. II
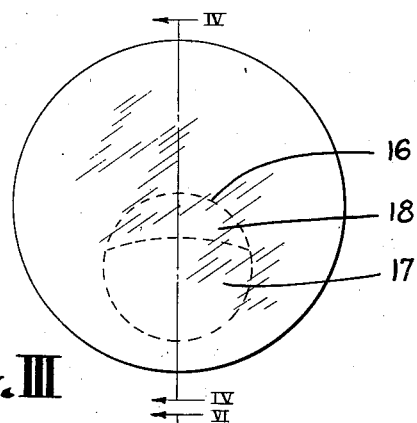
Fig. III
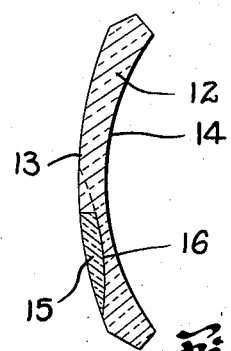
Fig. IV
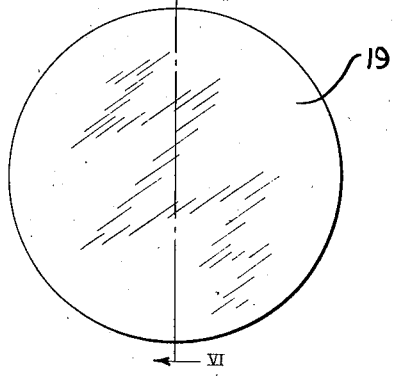
Fig. V
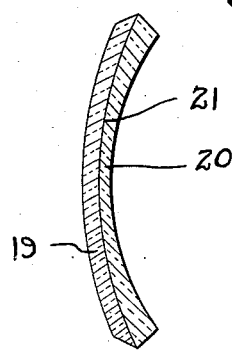
Fig. VI
INVENTOR.
BYRON J. ZIEGLER
BY
ATTORNEY.

Sept. 29, 1942.   B. J. ZIEGLER   2,297,122
PROCESS OF MAKING MULTIFOCAL LENSES
Filed Sept. 13, 1940    2 Sheets-Sheet 2
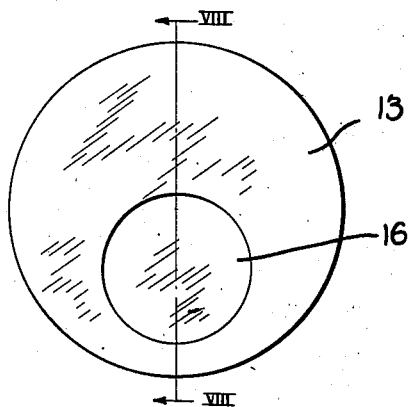
Fig. VII
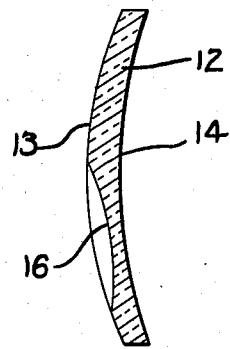
Fig. VIII
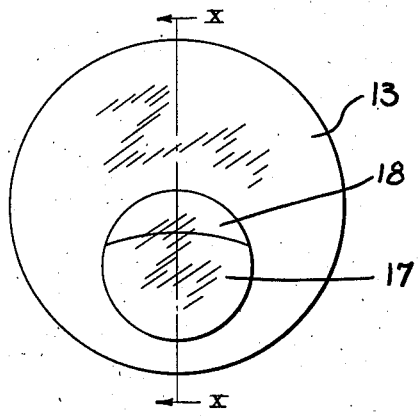
Fig. IX
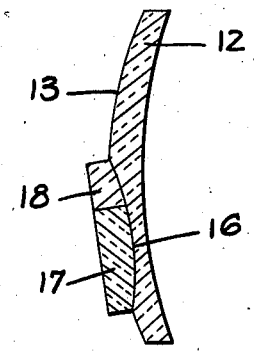
Fig. X
INVENTOR.
BYRON J. ZIEGLER
BY
ATTORNEY.

Patented Sept. 29, 1942

2,297,122

UNITED STATES PATENT OFFICE 2,297,122

PROCESS OF MAKING MULTIFOCAL LENSES

Byron J. Ziegler, Dudley, Mass., assignor to American Optical Company, Southbridge, Mass., a voluntary association of Massachusetts Application September 13, 1940, Serial No. 356,700

3 Claims. (Cl. 88—54)

This invention relates to a process for making fused vitreous articles, particularly lenses, having interfaces fused together.

An object of the invention is to provide improved processes for producing a clearer vitreous article having fused interfaces having a better light transmission than obtainable with present processes.

Another object of the invention is to provide improved processes of surfacing the interfaces of a fused vitreous article with a clay polishing material.

Another object of the invention is to provide improved processes for clay polishing the interface surfaces of lenses having separate portions fused together.

Another object of the invention is a process to provide improved means of making vitreous articles having separate parts fused together by treating their interface surfaces to increase the clearness and light transmission thereof and to make possible the use of many forms of vitreous material not now usable to reduce the cost of production and the prevention of waste by making possible the use of a wider variety of materials of a less costly nature and the insurance of a larger percentage of usable quality in production and the avoidance of the necessity of using only selected and expensive materials with a low percentage of usable quality, particularly in cases where fusing of materials of different color are involved.

Another object of the invention is a process to provide improved fused bifocal and laminated lenses.

Other objects and advantages of the invention will become apparent from the following description taken in conjunction with the accompanying drawings. It will be apparent that many changes in the arrangement of parts, the details of construction and the steps in the processes may be made without departing from the invention as expressed in the accompanying claims. It is therefore not desired to limit the invention to the exact matters set forth as the preferred forms only have been set forth by way of illustration.

Referring to the drawings:

Fig. I is a front view of a bifocal lens embodying the invention;

Fig. II is a cross section on line II—II of Fig. I;

Fig. III is a front view of another form of bifocal lens embodying the invention;

Fig. IV is a cross section on line IV—IV of Fig. III;

Fig. V is a front view of a laminated lens embodying the invention;

Fig. VI is a cross section on line VI—VI of Fig. V;

Fig. VII is a front view of the major portion of a bifocal lens;

Fig. VIII is a cross section on line VIII—VIII of Fig. VII;

Fig. IX is a front view of a bifocal lens blank partly finished; and

Fig. X is a cross section on line X—X of Fig. IX.

There are many forms of vitreous articles which are composed of separate pieces fused together. Many forms of bifocal and laminated lenses are so made. The industry founded on them is large and important in the arts. In many of these articles such as lenses it is highly desirable that the fused interfaces should be as clear as possible and that they should have the highest possible light transmission. Lenses are made usually of transparent optical glass with surfaces highly polished. It is a great consideration that their transparency and light transmission be the highest possible. This is particularly so with laminated and fused bifocal lenses. The surfaces of such lenses have in the past been ground with an abrasive such as emery and polished with a finer abrasive, rouge. It has been found from experience that surfaces polished with rouge have a tendency to devitrify when they are fused together so that they are less clear and have a lower light transmission through these fused surfaces.

This defect is particularly evident when glasses of different color are fused together as in the cases of superimposed layers of different color in laminated lenses and in bifocals where a clear near vision segment is fused in a colored major portion. In the production of such bifocals great difficulty has been encountered in getting the two glasses to fuse properly, so much so in fact that it has only been possible to make these bifocals by selecting special and very expensive glasses and even so the percentage of spoilage in fusion is high. It is therefore a principal object of this invention to provide interface surfaces that will fuse together so as to be clearer and to have a higher light transmission than is now obtainable and at the same time widen the range of glasses that may be used to cut expense and spoilage. The treatment of the interface surfaces as herein provided has been found to produce results of this kind far superior to those of present methods.

Referring to the drawings wherein similar reference characters denote corresponding parts throughout:

In Figs. I and II is shown an Iseikonic bifocal lens composed of an outer layer 1, an inner layer 2 and a near vision segment 3. The layers 1 and 2 are of optical crown glass, and the segment 3 is of a glass having a different index of refraction from the other layers. The surfaces 4, 5 and 6 are finished optical lens surfaces. The surfaces 7 and 8 of the segment 3 are also finished optical surfaces. This lens is made by grinding and polishing the recess shown by the surface 8 in the layer 2. This recess is made circular as shown in dotted lines in Fig. I at 9. The segment 3 is made in two pieces 10 and 11—Fig. I. The part 11 is the same index of refraction as the layer 2, the part 10 is of a different index of refraction. The parts 10 and 11 are assembled in the recess 8 and the parts fused together. The part 11 being the same index of refraction as 2 will disappear on fusing leaving only the part 10 visible.

The surfaces 5 of the layers 1 and 2 are next ground and polished and then fused together producing the assembly shown in Fig. II.

The interface surfaces are 8 and 5. In the past these surfaces would have been ground with emery and polished with rouge. On fusing these interface surfaces were dulled and their light transmission cut down considerably. In the processes of this invention the interface surfaces are ground with emery as in the past but they are not polished with rouge but are polished with a treated clay abrasive as described hereunder.

In Figures III and IV is shown another form of bifocal comprising a major portion 12 having the surfaces 13 and 14. The near vision segment 15 is fused in a recess 16 in the major portion. The process of forming the segment of this bifocal is similar to that for Figs. I and II. The segment 15 is made in two parts 17 and 18. The recess 16 is circular. The parts 17 and 18 are assembled in the recess 16 and fused together. The part 17 is of different index of refraction from the major portion 12 but the part 18 is of the same index of refraction as the major portion and disappears on fusion.

The interface in this bifocal is the surface 16 of the recess and the contacting surface of the segment 15. These surfaces I grind with emery and polish with the treated clay abrasive of this invention.

In Figs. V and VI is shown a laminated lens having the layers 19 and 20. These layers are fused on the interface surfaces at 21. These surfaces I grind with emery but polish with the treated clay abrasive of this invention. In many instances the colors of the two layers 19 and 20 are different and it has been found difficult to get two glasses of desired color to fuse together. Usually special and expensive glasses have to be selected. When the interfaces are polished with the treated clay abrasive of this invention fusion has proven more ready and a wider range and cheaper glasses may be used. The percentage of spoilage is also greatly reduced.

In Figs. VII and VIII is shown the blank for the major portions of the bifocals of Figs. III and IV.

In Figs. IX and X is the assembly of the major portion and the segment of the bifocal shown in Figs. III and IV.

From the above it will be seen that the interfaces that have been fused together have all first been polished on the interface surfaces with the treated clay abrasive of this invention. It is this treatment that makes the interfaces clearer and of a higher light transmission after fusion, and makes the fusion more ready during the fusion operations.

In many instances the segments of bifocal lenses are of different color from the major portion. Usually the major portion is of colored glass and the segment of white, although that too may be colored. It is in the production of these colored bifocal lenses that the greatest difficulty has been encountered in fusing, only specially selected and expensive glasses could be used and even these gave a very high spoilage on fusion. With this invention a greater range of glasses may be used and the spoilage percentage is greatly decreased.

The polisher used in this invention in polishing the interface surfaces that are to be fused comprises a fine grained material of a hardness that will polish glass without scratching which is the resultant from the heat treatment of a hydrated metallic compound to a temperature that trial of said material in polishing a substance of substantially the hardness of glass with said material heat treated through a range of several different temperatures has demonstrated will give the said material the maximum non-scratching efficiency for the substance being polished with an efficiency of quality of polish and speed of operation in obtaining the same substantially equal to that of rouge. One of the best of these polishers and the one used by me with good results is a clay low in silica heat treated as indicated above. These polishers may be produced by heat treating a fine grained, nontoxic, nonstaining material as set forth above.

The grinding and polishing operations are carried out in a manner similar to those in use for grinding and polishing glass, and in the production of finished optical lens surfaces.

From the foregoing it will be seen that a simple, economic and practicable process has been provided for obtaining all the objects and advantages of the invention.

Having described my invention I claim:

1. The process of producing a blank for a multifocal lens comprising forming a major and a minor piece of glass for fusion with each other which normally results in interfacial devitrification when said pieces have been surfaced by rouge, forming and preparing a countersink for fusion in said major piece of lens medium by polishing the countersink surface with a fine-grained calcined clay, edge-joining said minor piece of lens medium with a piece of lens medium of a different index of refraction than said minor piece to produce a composite button, forming and preparing a surface on said composite button for fusion in said countersink by polishing said surface with a fine-grained calcined clay, placing said composite button in the countersink with the fusion prepared surfaces of the composite button and said major piece in contiguous relation with each other and subjecting said pieces of lens medium to heat of a temperature sufficient to bring about fusion of said prepared surfaces, to the end that said pieces of glass are integrally united, with said joined surfaces being substantially free from interfacial devitrification.

2. The process of fusion joining the surfaces of pieces of glass which normally results in interfacial devitrification when said surfaces have been polished by rouge, comprising preparing pieces of such glass for fusion by polishing surfaces thereon with a fine-grained calcined clay, placing said finished optical surfaces in contiguous relation with each other and subjecting said pieces of glass to heat of a temperature sufficient to bring about fusion of said finished optical surfaces, to the end that said pieces of glass are integrally united, with said joined surfaces being substantially free from interfacial devitrification.

3. The process of producing a multifocal lens comprising forming a major and a minor piece of glass for fusion with each other which normally results in interfacial devitrification when said pieces have been surfaced by rouge, forming and preparing a countersink for fusion in said major piece of lens medium by polishing the countersink surface with a fine-grained calcined clay, edge-joining said minor piece of lens medium with a piece of lens medium of a different index of refraction than said minor piece to produce a composite button, forming and preparing a surface on said composite button for fusion in said countersink by polishing said surface with a fine-grained calcined clay, placing said composite button in the countersink with the fusion prepared surfaces of the composite button and said major piece in contiguous relation with each other, subjecting said pieces of lens medium to heat of a temperature sufficient to bring about fusion of said prepared surfaces, to the end that said pieces of glass are integrally united, with said joined surfaces being substantially free from interfacial devitrification, and forming finished optical surfaces on the opposed sides of said fusion joined pieces of glass to control the curvatures which when combined with each other will produce the optical characteristics desired of the finished lens.

BYRON J. ZIEGLER.